United States Patent [19]
Simonetti

[11] Patent Number: 5,813,288
[45] Date of Patent: Sep. 29, 1998

[54] STEERING COLUMN CLOSE-OUT BOOT

[75] Inventor: Vincent J. Simonetti, Ferndale, Mich.

[73] Assignee: Chrysler Corporation, Auburn Hills, Mich.

[21] Appl. No.: 694,122

[22] Filed: Aug. 8, 1996

[51] Int. Cl.⁶ .............................. B62D 1/18; B61F 15/22
[52] U.S. Cl. ....................... 74/492; 180/90; 277/212 FB; 277/221; 280/780; 296/70; 403/381
[58] Field of Search ........................ 74/492, 493; 180/90; 280/779, 775, 780, 777; 277/212 FB, 221; 296/70; 403/105, 331, 381

[56] References Cited

U.S. PATENT DOCUMENTS

| | | | |
|---|---|---|---|
| 3,424,025 | 1/1969 | Harper | 74/493 |
| 4,899,612 | 2/1990 | Bruhnke et al. | 74/493 |
| 5,431,601 | 7/1995 | Nakamura | 277/212 FB X |
| 5,482,396 | 1/1996 | Guillemet | 403/381 X |

Primary Examiner—Alllan D. Herrmann
Attorney, Agent, or Firm—Lawrence J. Shurupoff

[57] ABSTRACT

A close-out boot for use in conjunction with a steering column of a motor vehicle. The boot is made of a flexible, elastomeric material. The boot is in the form of a transversely split annulus, and U-shaped in cross-section to provide an annular radially inner wall having ends abutting at the split and an annular radially outer wall having ends abutting at the split. The radially inner wall is adapted to engage and seal around the steering column. The ends of the inner wall have complementary coupling parts adapted to be releasably connected together. The coupling parts comprise a T-shaped, open-ended slot on one end of the inner wall, and a T-shaped tongue on the other end of the inner wall insertable into the slot. The radially outer wall is adapted to be secured to vehicle support structure.

10 Claims, 5 Drawing Sheets

STEERING COLUMN CLOSE-OUT BOOT

FIELD OF THE INVENTION

This invention relates to a close-out boot for use with the steering column of a motor vehicle.

BACKGROUND AND SUMMARY OF THE INVENTION

The steering column of a motor vehicle extends through an opening in the instrument panel. This opening has to be large enough to provide clearance for the full tilt of the steering column. What is needed is a shield to close the opening around the steering column which is aesthetically pleasing in appearance and will not interfere with the full travel and tilt of the steering column.

In accordance with the present invention, a close-out boot is provided which is made of a flexible elastomeric material, such, for example, as rubber. The boot is preferably in the form of an annulus which is U-shaped in cross-section to provide a radially inner wall attachable to the steering column and a radially outer wall attachable to suitable vehicle support structure such as the instrument panel. The boot is preferably transversely split to enable it to be quickly and easily assembled around the steering column, with complementary coupling parts for releasably securing the abutting ends of the boot together.

The coupling parts preferably include a slot on one end of the inner wall of the boot and a tongue on the other end releasably received in the slot. The slot is preferably generally T-shaped and has an open end and the tongue is also generally T-shaped and is insertable into the slot through the open end. The tongue is prevented from endwise movement when assembled in the slot, preferably by interengaging teeth in the slot and on the tongue.

One object of this invention is to provide a close-out boot for a steering column having the foregoing features and capabilities.

Another object is to provide a close-out boot of simple construction which is capable of a long period of use without failure, and is capable of being readily and inexpensively manufactured and installed.

These and other objects, features and advantages of the invention will become more apparent as the following description proceeds, especially when considered with the accompanying drawings.

DETAILED DESCRIPTION OF THE PREFERRED EMBODIMENT

Figure 1:
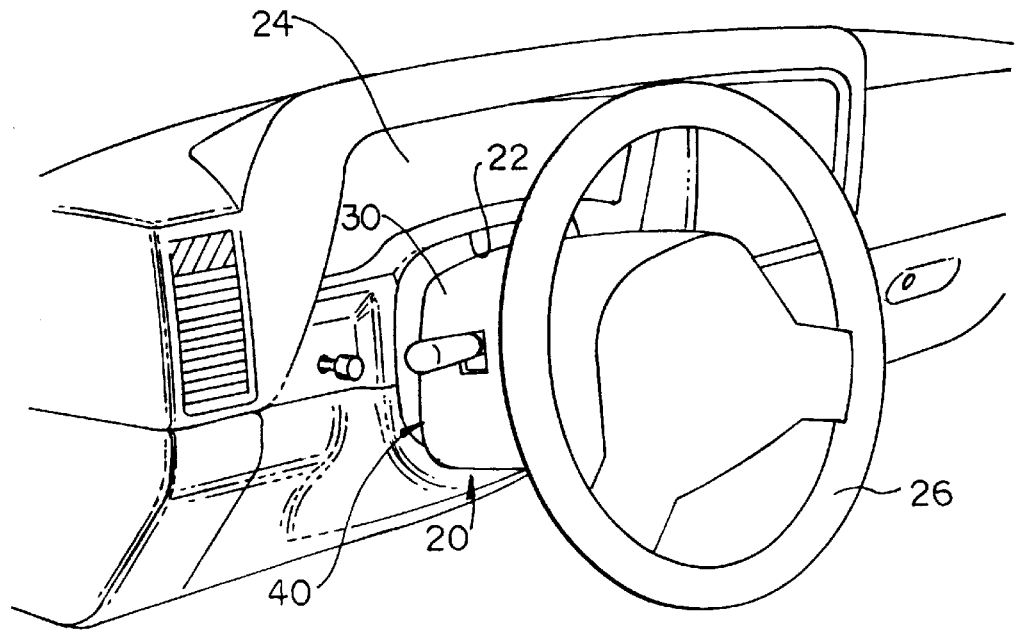
FIG. 1 is a fragmentary perspective view of the inside of an automobile showing the instrument panel and steering column as seen from a position just to the left of the driver seat.
Figure 2:
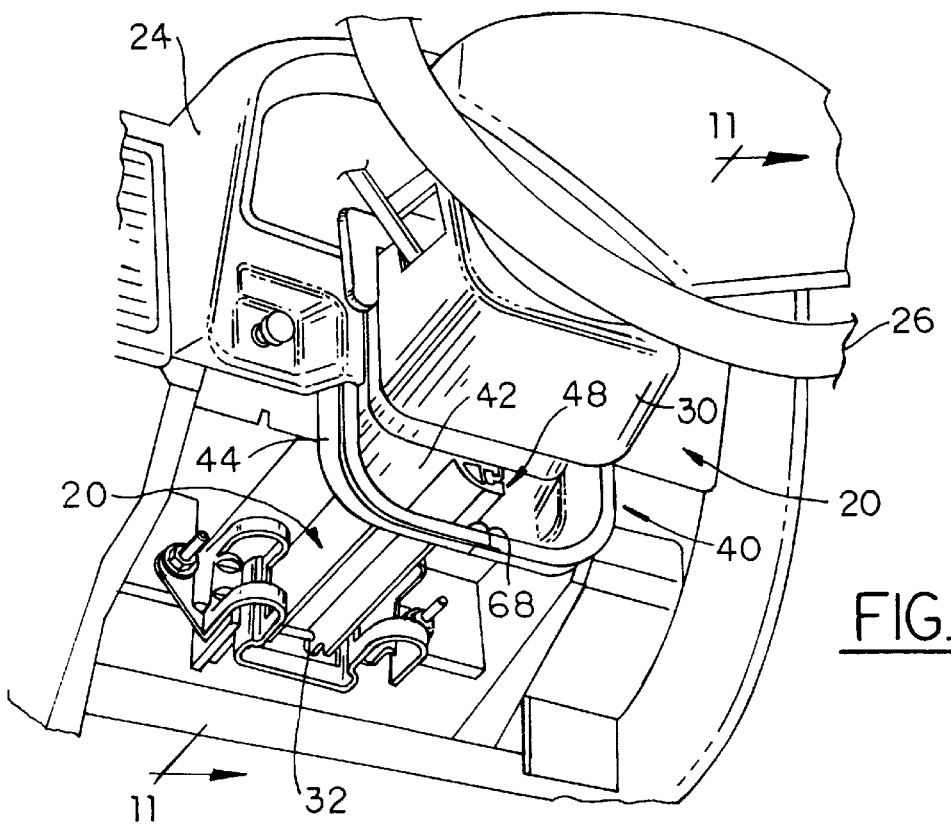
FIG. 2 is an enlarged fragmentary perspective view of part of the structure in FIG. 1, but as seen from a lower angle.
Figure 3:
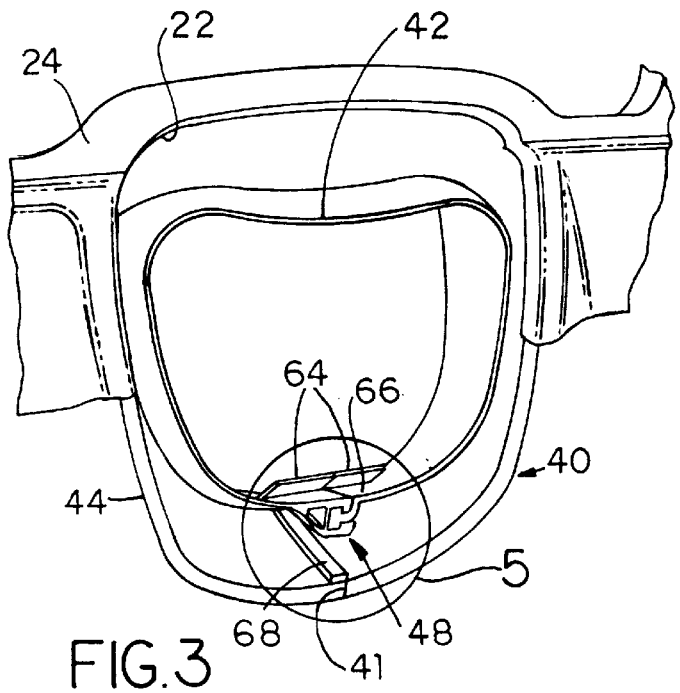
FIG. 3 is an enlarged fragmentary view looking forwardly from the driver's seat, showing a boot constructed in accordance with this invention attached to the instrument panel, but with the steering column removed.
Figure 5:
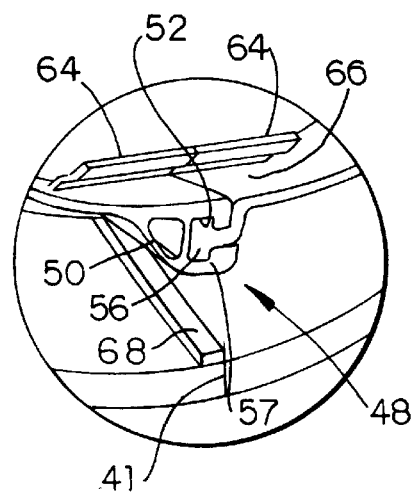
FIG. 5 is an enlarged detail of the structure shown within the circle 5 in FIG. 3.
Figure 4:
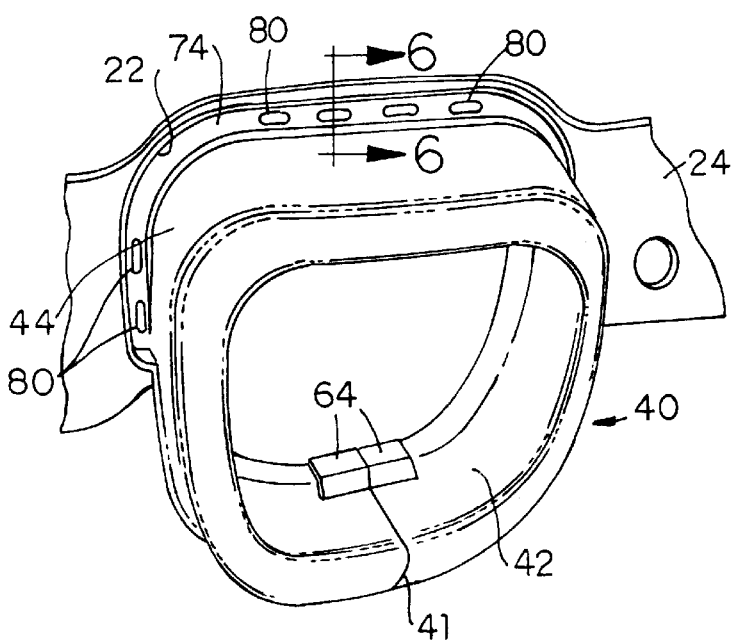
FIG. 4 is a view showing the structure of FIG. 3, but as viewed from the opposite side.

Referring now more particularly to the drawings, and especially FIGS. 1, 2, 11 and 12, there is shown a steering column 20 projecting generally upwardly and rearwardly through an opening 22 in the instrument panel 24 of an automotive vehicle. The steering column has a steering wheel 26 at the upper end of the elongated steering shaft 27. The steering shaft extends lengthwise within an elongated jacket or tube 28. A housing 30 for turn signal, windshield wiper and other control devices is mounted on the jacket 28 near the steering wheel. The steering column is pivoted at 32 for up and down movement. A plate 34 is provided to cover the pivot mounting.

The opening 22 is large enough to allow for full travel and tilt of the steering column 20. In order to seal and close the space between the opening and the steering column, a boot 40 is provided.

The boot 40 is made of a flexible elastomeric material, such, for example, as natural or synthetic rubber. The boot is in the form of an annulus with a transverse split 41 so that it can be opened and closed around the steering column. The boot is U-shaped in cross-section throughout its length to provide an annular radially inner wall 42 and an annular radially outer wall 44. The ends of the boot, including the ends of the inner wall and the ends of the outer wall, abut at the split when assembled around the steering column.

Figure 7:
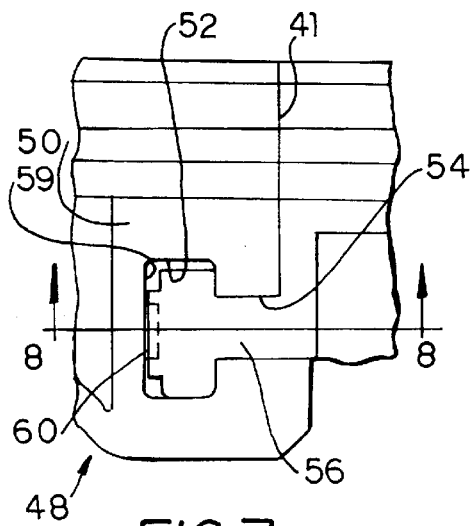
FIG. 7 is a fragmentary detail showing the interconnection of the tongue and slot for coupling together the ends of the boot adjacent to the split.
Figure 9:
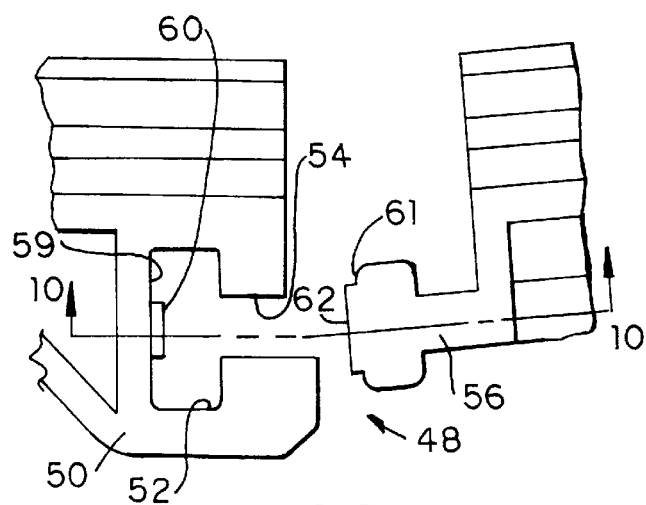
FIG. 9 is a view similar to FIG. 7, but with the tongue removed from the slot.
Figure 8:
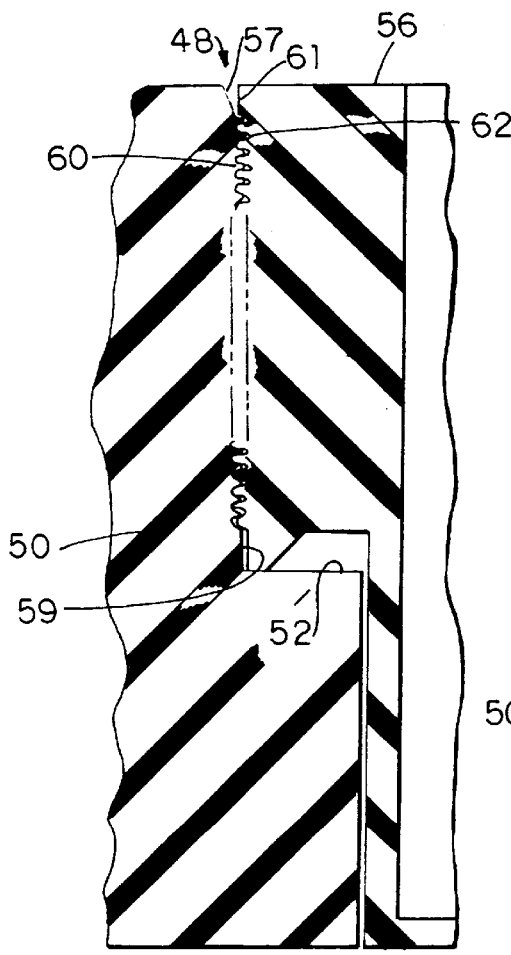
FIG. 8 is a sectional view taken on the line 8—8 in FIG. 7.
Figure 10:
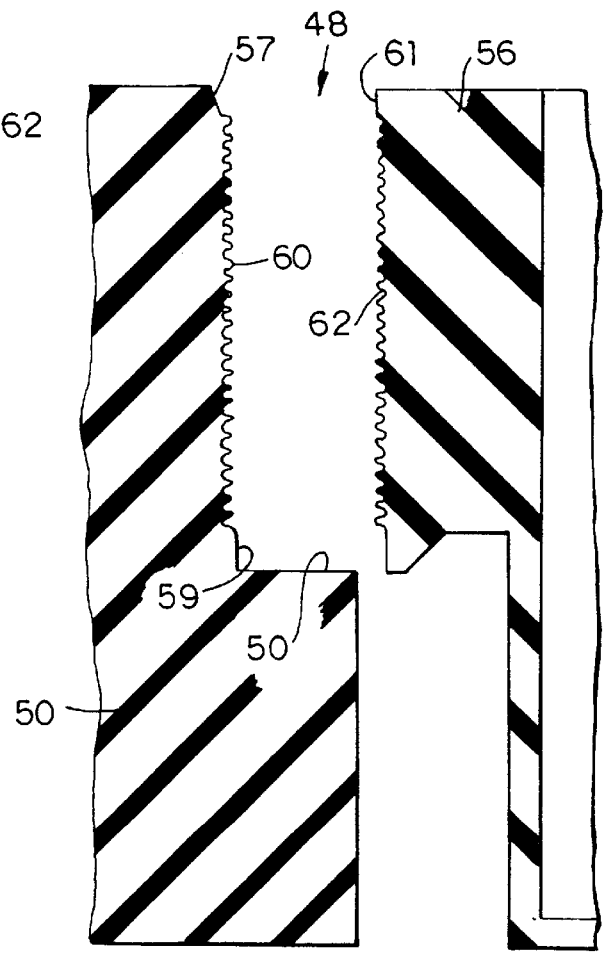
FIG. 10 is a sectional view taken on the line 10—10 in FIG. 9.
Figure 11:
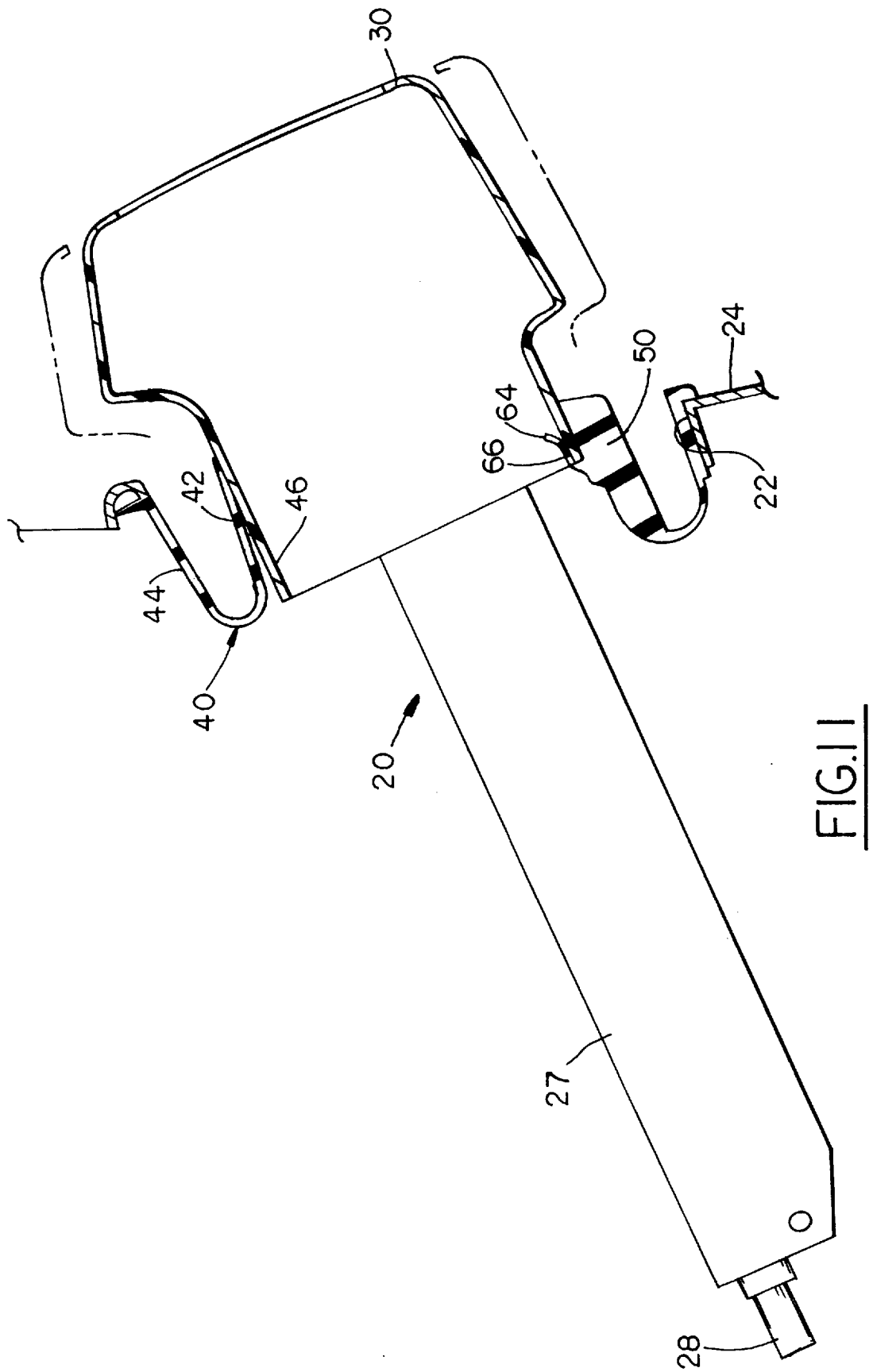
FIG. 11 is a sectional view taken on the line 11—11 in FIG. 2.
Figure 12:
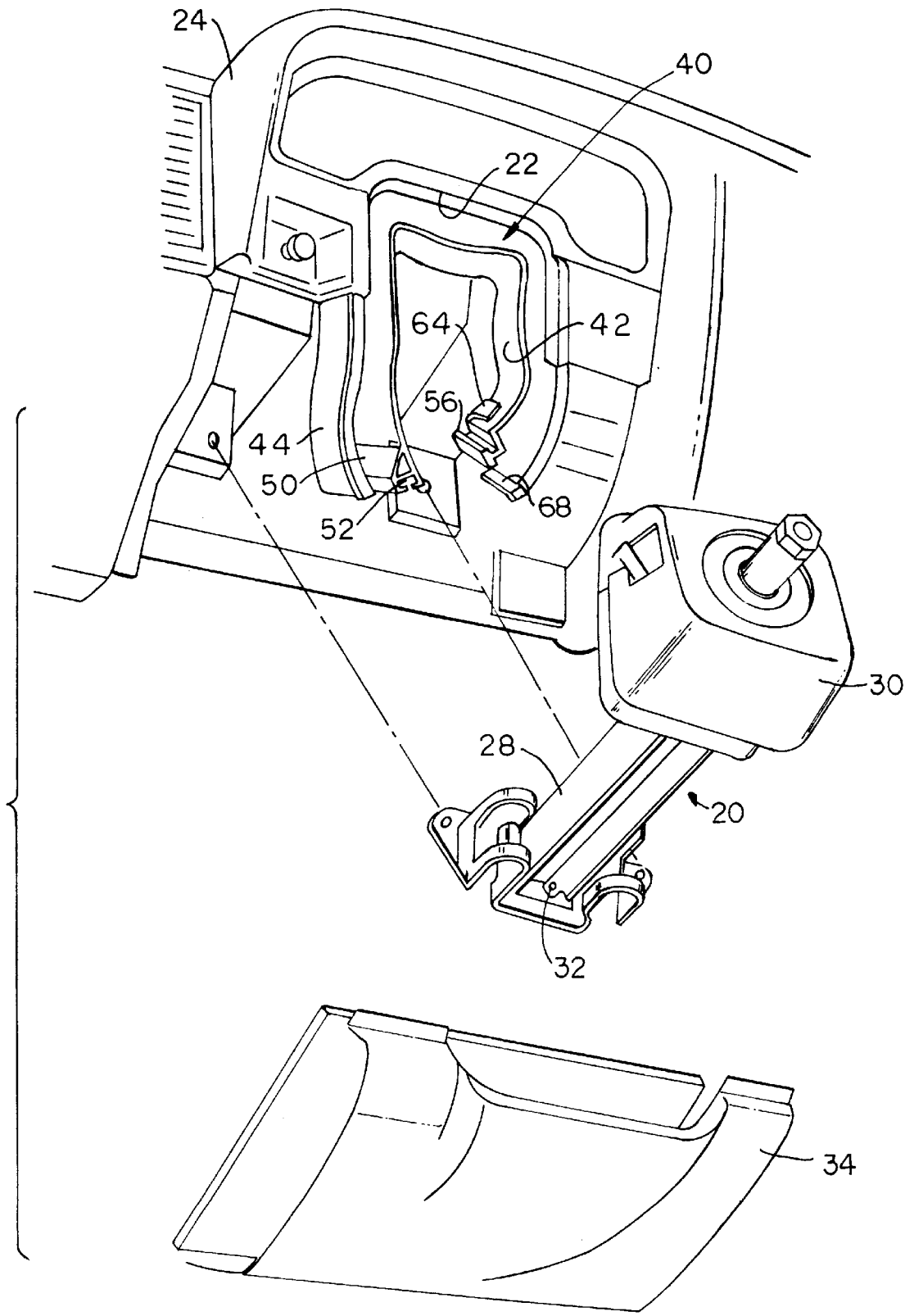
FIG. 12 is an exploded fragmentary perspective view showing the steering column separated from the instrument panel and boot, and the boot open to receive the steering column.

The radially inner wall 42 tightly engages over and forms a seal around an annular flange 46 of the housing 30 of the steering column. In order to hold the inner wall of the boot thus tightly engaged around the annular flange of the housing, the ends of the inner wall are coupled together by a coupling 48 forming a releasable connection. The coupling 48 includes an integral enlargement 50 which may be formed of one piece with the boot on the radially outer surface of the inner wall of the boot adjacent one end thereof. The enlargement 50 has an elongated T-shaped slot 52 with the stem of the slot opening through a wall of the enlargement as indicated at 54. The coupling 48 also includes an integral T-shaped tongue 56 formed of one piece with the other end of the inner wall 42, of the same size and configuration as slot 52 to tightly fit within the slot as shown in FIGS. 7 and 8. One end 57 of the slot is open to permit the endwise insertion of the tongue in the slot.

In order to resist the endwise removal of the tongue 56 from the slot 52, the top wall 59 of the crossing portion of the slot is formed with a series of transverse teeth 60 which are closely spaced apart lengthwise thereof. The outer surface 61 of the crossing portion of the T-shaped tongue 56 is likewise formed with transverse teeth 62 closely spaced part along the length thereof which interengage with the teeth in the slot. Because of the flexible nature of the material of the boot, and because of the somewhat inclined configuration of the side walls of the teeth, the tongue can be removed endwise from the slot against the holding action of the teeth, but requiring a strong manual force to do so.

Integral tabs 64 preferably of one piece with the radially inner surface of the inner wall 42 of the boot cooperate with the inner wall in defining recesses 66 to receive the flange 46 of the housing 30 of the steering column to locate the housing relative to the inner wall. The tabs are preferably formed adjacent to the split at the inner ends of the inner wall.

The abutting ends of the outer wall 44 of the boot are preferably held together by an integral tab extension 68 on one of the abutting ends which overlies the other abutting end. These abutting ends of the outer wall may desirably be secured together as by an adhesive or heat seal.

Figure 6:
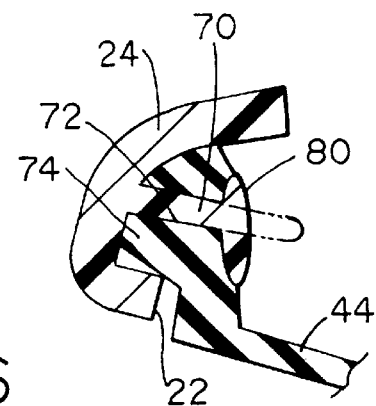
FIG. 6 is a fragmentary sectional view taken on the line 6—6 in FIG. 4.

The outer wall 44 of the boot at the diametrically opposite side from the abutting ends is secured to a vehicle support structure, that is to the instrument panel 24 around the opening 22 throughout a minor extent of its circumference preferably by integral pins 70 formed on the instrument panel adjacent the opening which extend through preformed holes 72 in a marginal flange 74 along the edge of the outer wall. The instrument panel and pins are formed of a suitable thermoplastic material. The pins 70 when heated and when pressure is applied can be pressed down on the flange 74 and deformed around the openings therein as shown in FIG. 6. FIG. 6 shows one of the pins 70 in dotted lines after it has been inserted through a hole in the flange 74 of the outer wall of the boot, and in solid lines after heat and pressure is applied to form a head 80 on the pin to physically retain the flange.

What is claimed is:

1. A close-out boot for use in conjunction with a steering column of a motor vehicle, the boot being adapted to seal around an annular flange of a housing carried by the steering column, said boot being made of a flexible elastomeric material, said boot being in the form of an annulus with a transverse split, and U-shaped in cross-section to provide an annular radially inner wall having ends abutting at the split and an annular radially outer wall having ends abutting at the split, said radially inner wall being adapted to engage and seal around said annular flange of said housing, said ends of said inner wall having complementary coupling parts adapted to be releasably connected together, and said radially outer wall being adapted to be secured to vehicle support structure.

2. A close-out boot as defined in claim 1, and further including means for connecting the abutting ends of the outer wall.

3. A close-out boot as defined in claim 1, wherein said coupling parts comprise means providing a slot on one end of said inner wall, and means providing a tongue on the other end of said inner wall releasably received in said slot.

4. A close-out boot as defined in claim 3, wherein said slot is generally T-shaped and has an open end, and said tongue is generally T-shaped and insertable into said slot through said open end.

5. A close-out boot as defined in claim 4, and further including means for resisting endwise movement of said tongue in said slot.

6. A close-out boot as defined in claim 5, wherein said means for resisting endwise movement of said tongue in said slot comprises interengaging teeth in said slot and on said tongue.

7. A close-out boot as defined in claim 6, and further including tabs on said inner wall cooperating with said inner wall in defining recesses to receive the flange of the housing on the steering column to locate said housing relative to said inner wall.

8. A close-out boot as defined in claim 7, wherein said tabs are formed integrally with inner wall adjacent to the ends thereof.

9. A close-out boot as defined in claim 8, and further including means for connecting the abutting ends of the outer wall.

10. A close-out boot as defined in claim 9, wherein said radially outer wall of said boot has a marginal flange diametrically opposite the split provided with holes to receive pins projecting from the vehicle support structure to secure the boot thereto.

\* \* \* \* \*